US012409535B2

(12) United States Patent
Liaw

(10) Patent No.: US 12,409,535 B2
(45) Date of Patent: Sep. 9, 2025

(54) PNEUMATIC HAMMER

(71) Applicant: Jian-Shiou Liaw, Taichung (TW)

(72) Inventor: Jian-Shiou Liaw, Taichung (TW)

( * ) Notice: Subject to any disclaimer, the term of this patent is extended or adjusted under 35 U.S.C. 154(b) by 314 days.

(21) Appl. No.: 18/323,023

(22) Filed: May 24, 2023

(65) Prior Publication Data

US 2024/0391072 A1 Nov. 28, 2024

(51) Int. Cl.

| | |
|---|---|
| ***B25B 27/00*** | (2006.01) |
| ***B25B 27/02*** | (2006.01) |
| ***B25D 9/04*** | (2006.01) |
| ***B25D 17/04*** | (2006.01) |

(52) U.S. Cl.

CPC ........ *B25B 27/026* (2013.01); *B25B 27/0035* (2013.01); *B25D 9/04* (2013.01); *B25D 17/043* (2013.01); *B25D 2250/121* (2013.01)

(58) Field of Classification Search

CPC .......... B25D 9/04; B25D 9/02; B25D 17/043; B25D 17/06; B25D 2250/065; B25D 2250/121; B25D 2250/125; B25D 2250/181; B25D 2250/365; B25B 27/06

See application file for complete search history.

(56) References Cited

U.S. PATENT DOCUMENTS 6,978,527 B2 12/2005 Oser
2022/0402108 A1* 12/2022 Wang ...................... B25D 9/00

FOREIGN PATENT DOCUMENTS

TW I595980 B 8/2017

* cited by examiner

*Primary Examiner* — Christopher J. Besler

(74) *Attorney, Agent, or Firm* — MUNCY, GEISSLER, OLDS & LOWE, P.C.

(57) ABSTRACT

A pneumatic hammer is provided, including: a handle assembly including a main body and a grip portion, the grip portion being connected to the main body and configured to be connected to a gas source, the main body including an interior space; a hammer assembly connected to and in communication with the grip portion, and including a hammer body and a shaft, the hammer body being movably connected to the shaft, and the hammer body being movably disposed in the interior space to hammer the shaft; and a working assembly including a rigid rod and a driving member, the rigid rod being connected to and movable with the shaft, the driving member being positioned to the rigid rod.

9 Claims, 6 Drawing Sheets

PNEUMATIC HAMMER

BACKGROUND OF THE INVENTION

Field of the Invention

The present invention relates to a dismantling hand tool, particularly to a pneumatic hammer for dismantling.

Description of the Prior Art

Pneumatic hammer is a tool that uses compressed air as a power source. By driving the hammer to impact the shaft back and forth, the shaft transmits the impact force to the target to perform various operations such as pulling, hammering, digging or cutting. For use in maintenance of automobiles, a pneumatic hammer is often used to disassemble auto parts (such as fuel injectors) that are difficult to dismantle. This kind of tool is like one disclosed in TW 1595980 or U.S. Pat. No. 6,978,527.

However, the pneumatic hammer of TW 1595980 provides an insufficient impact force, is not ergonomic in operation, and needs to be assembled with various components, which is inconvenient and time-consuming to use. As to the pneumatic hammer of U.S. Pat. No. 6,978,527, there is a problem that the pneumatic hammer will move around uncontrollably due to the continuous action of the hammer unexpectedly disengaged from the fuel nozzle when the fuel nozzle is detached from the vehicle engine, and thus the pneumatic hammer can injure the user and cause damage to other parts of the vehicle.

The present invention is, therefore, arisen to obviate or at least mitigate the above-mentioned disadvantages.

SUMMARY OF THE INVENTION

The main object of the present invention is to provide a pneumatic hammer which can be stably and effectively gripped with high safety.

To achieve the above and other objects, a pneumatic hammer is provided, including: a handle assembly including a main body and a grip portion, the grip portion being connected to the main body and configured to be connected to a gas source, the main body including an interior space; a hammer assembly connected to and in communication with the grip portion, and including a hammer body and a shaft, the hammer body being movably connected to the shaft, and the hammer body being movably disposed in the interior space to hammer the shaft; and a working assembly including a rigid rod and a driving member, the rigid rod being connected to and movable with the shaft, the driving member being positioned to the rigid rod.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
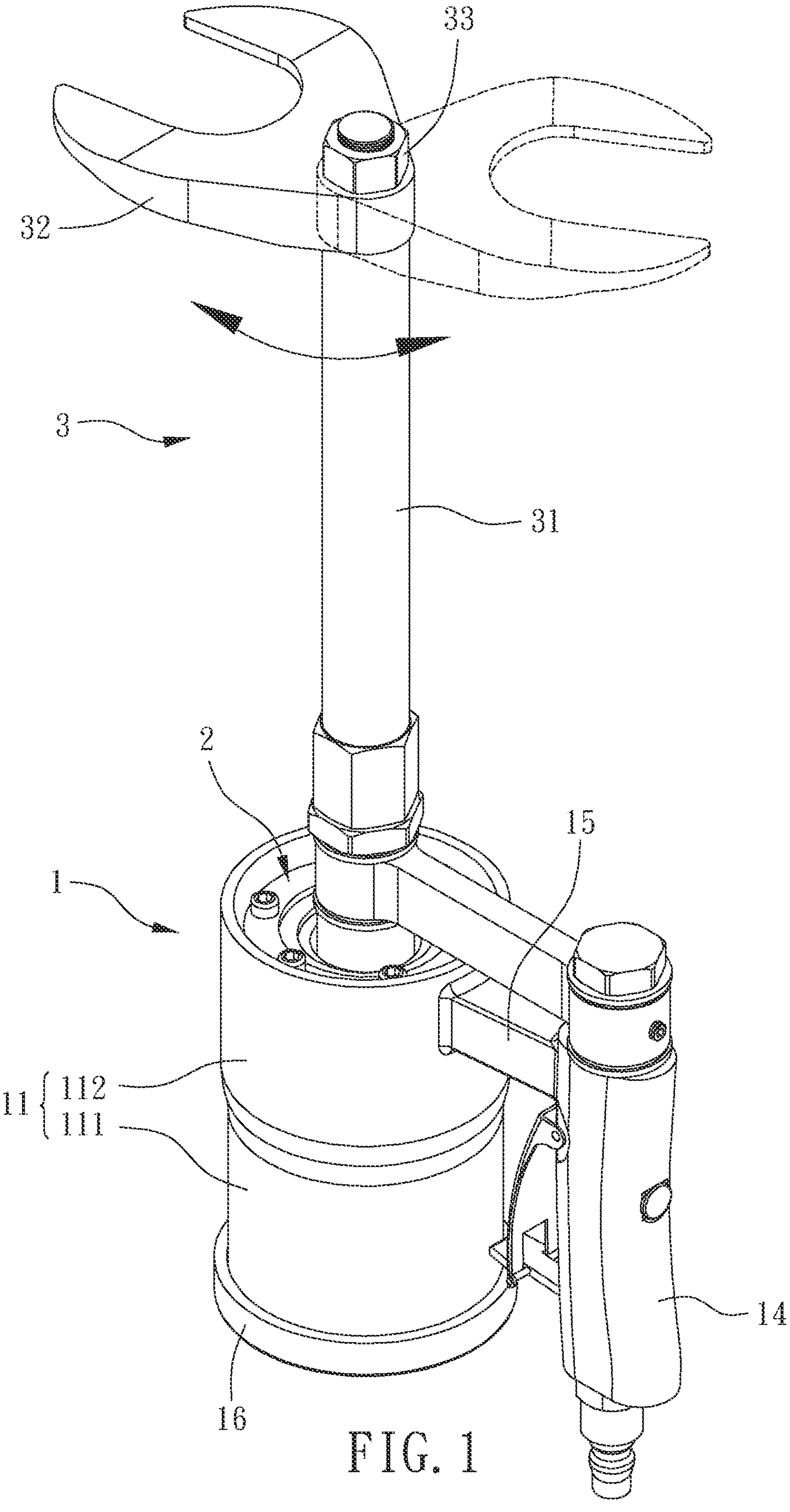
FIG. 1 is a stereogram of an exemplary embodiment of the present invention.
Figure 2:
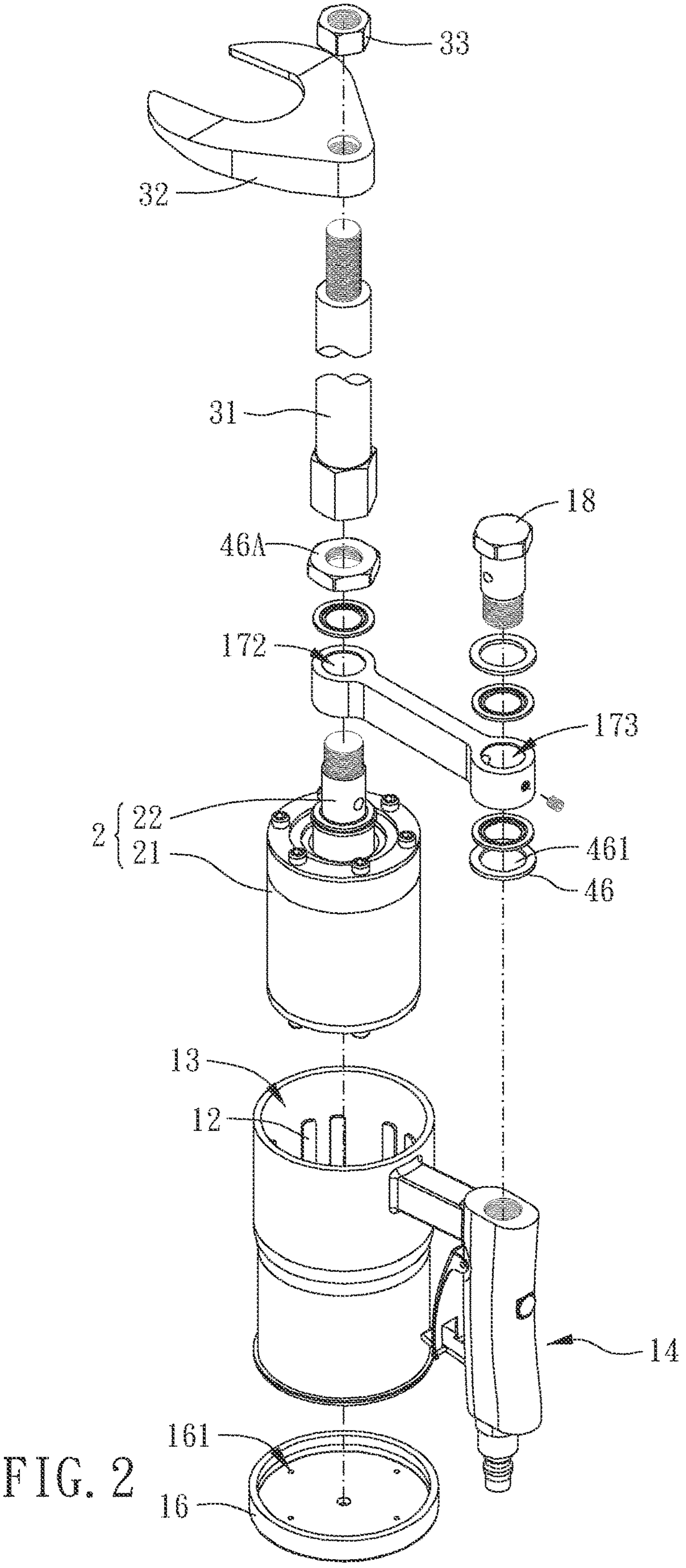
FIG. 2 is a breakdown drawing of FIG. 1.
Figure 3:
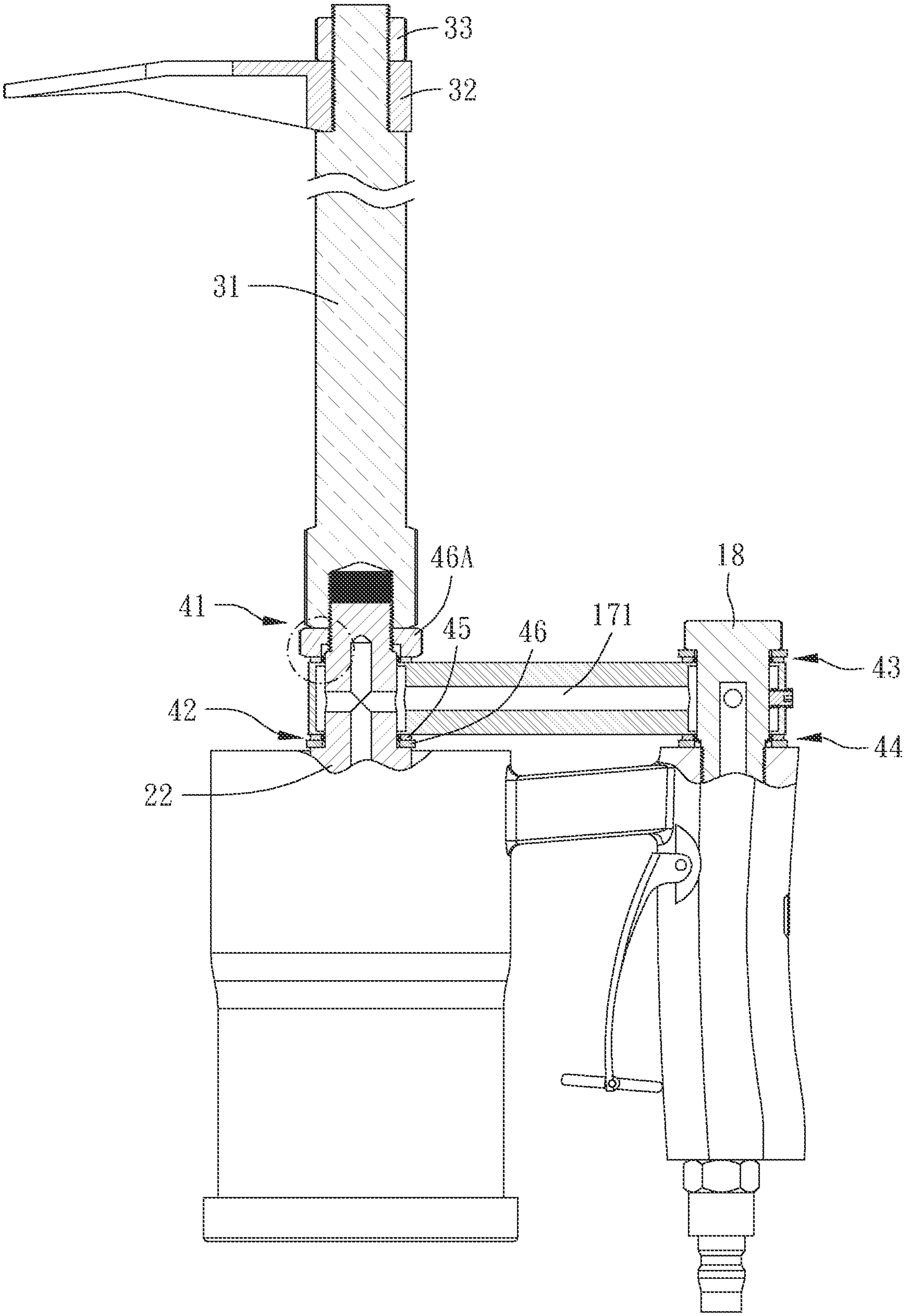
FIG. 3 is a side view with a partial cross-sectional portion of an exemplary embodiment of the present invention.
Figure 4:
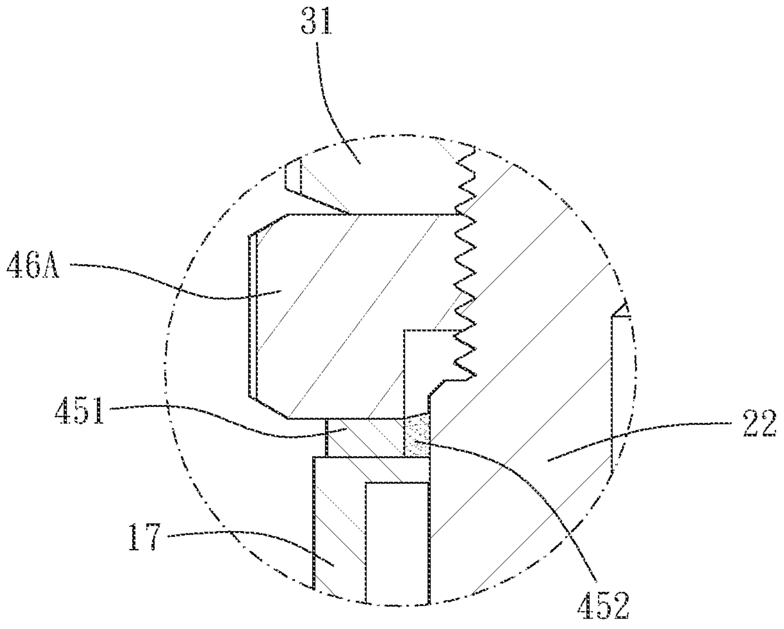
FIG. 4 is a partial enlargement of FIG. 3.
Figure 5:
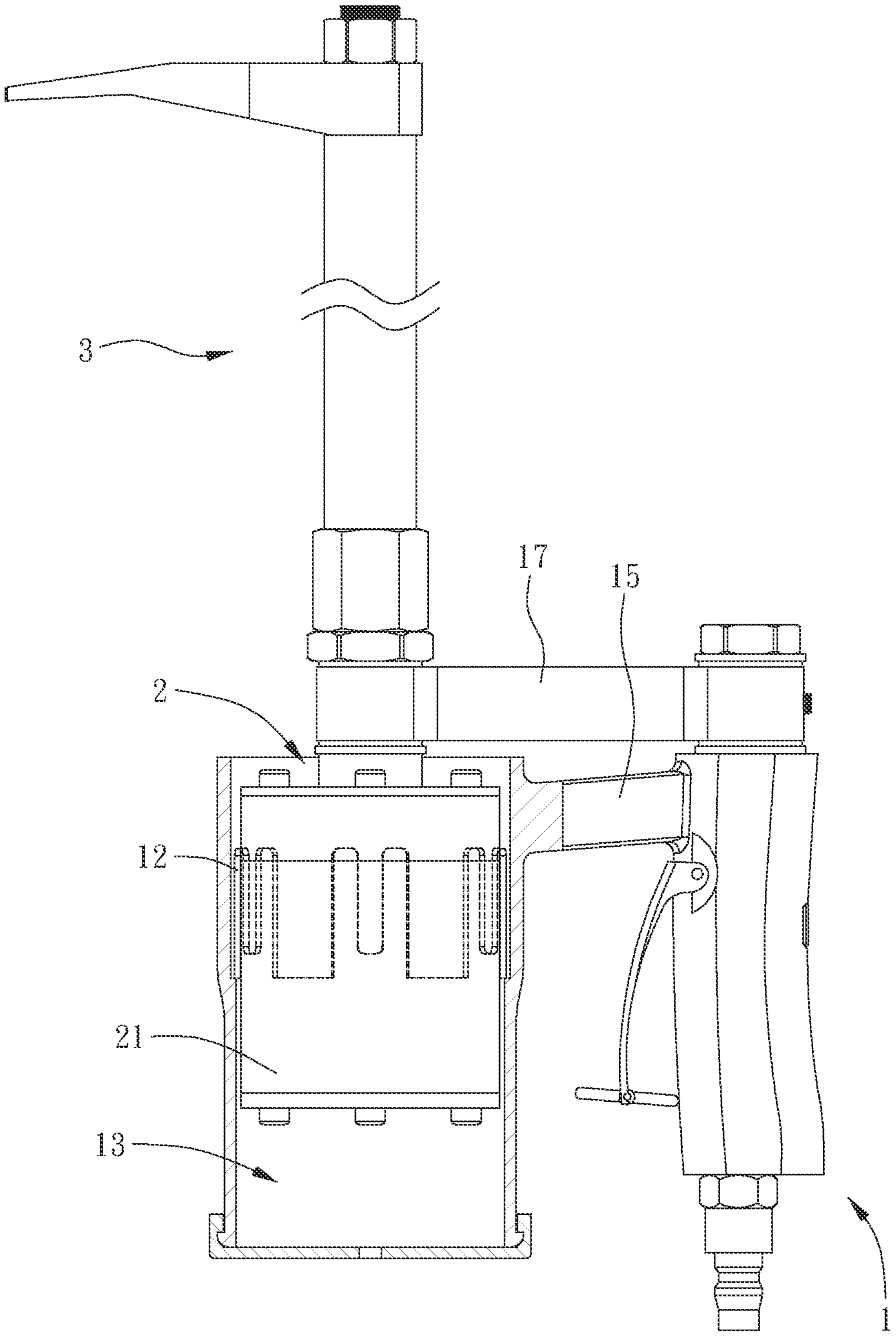
FIG. 5 is a side view with another partial cross-sectional portion of an exemplary embodiment of the present invention.
Figure 6:
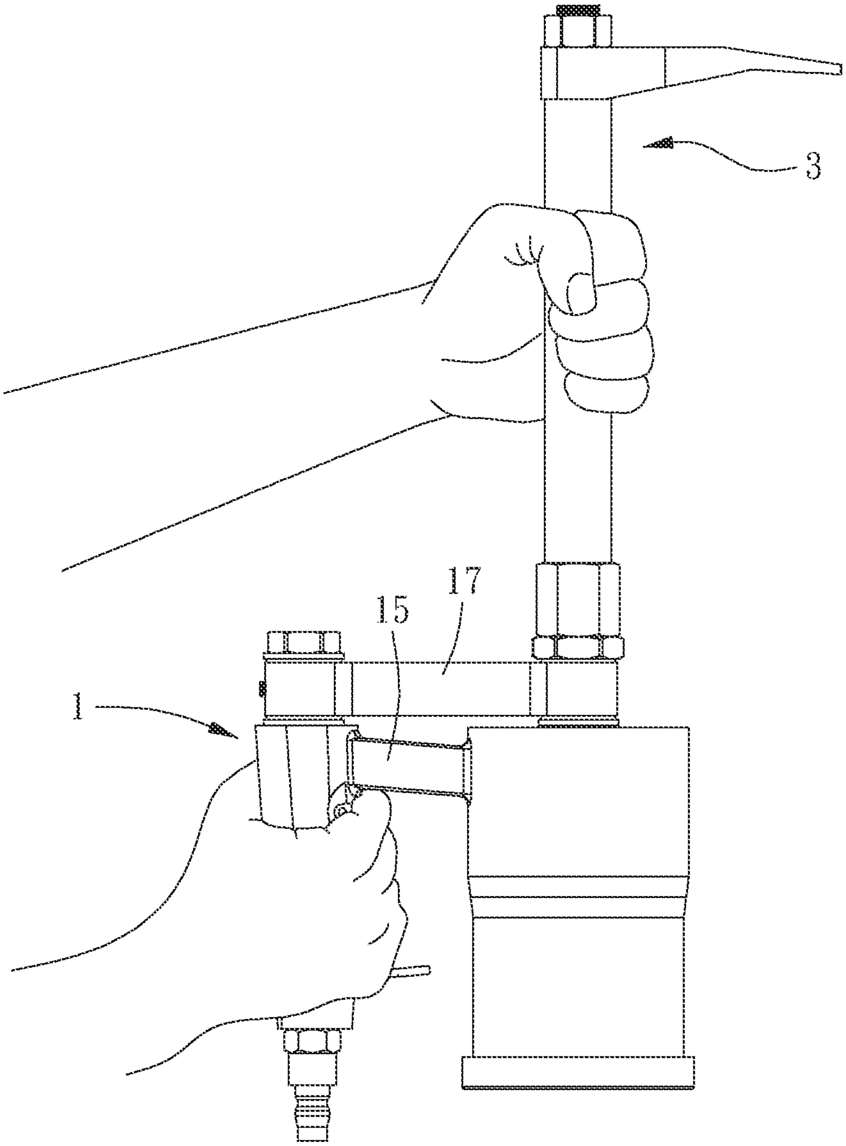
FIG. 6 is a drawing showing operation of a pneumatic hammer of an exemplary embodiment of the present invention.

Please refer to FIGS. 1 to 6 for an exemplary embodiment of the present invention. A pneumatic hammer of the present invention includes a handle assembly 1, a hammer assembly 2 and a working assembly 3.

The handle assembly 1 includes a main body 11 and a grip portion 14, the grip portion 14 is connected to the main body 11 and configured to be connected to a gas source, and the main body 11 includes an interior space 13. The hammer assembly 2 is connected to and in communication with the grip portion 14, the hammer assembly 2 includes a hammer body 21 and a shaft 22, the hammer body 21 is movably connected to the shaft 22, and the hammer body 21 is movably disposed in the interior space 13 to hammer the shaft 22 to move. The working assembly 3 includes a rigid rod 31 and a driving member 32, the rigid rod 31 is connected to and movable with the shaft 22, and the driving member 32 is positioned to the rigid rod 31. The driving member 32 is horseshoe-shaped and can be hooked on objects, such as fuel injectors, to pull out the objects. The rigid rod 31 may be formed of one piece or multi-piece assembly.

Preferably, the rigid rod 31 is a solid rod so that it is sufficiently hard and strong to withstand the impact action force during operation.

Preferably, the rigid rod 31 has a length larger than a length of larger than the main body 11, which is advantageous for using in narrow spaces.

In operation, the grip portion 14 can be held by a hand of the user, and the rigid rod 31 can be further held by the other hand of the user. In other words, the rigid rod 31 can be used as an auxiliary grip rod in addition to transmitting force. Additionally, the main body 11 can prevent the hammer body 21 from doing harm to people and objects due to unexpected impact of the hammer body 21, which greatly improve safety.

Specifically, a plurality of ribs 12 project on an inner surface of the main body 11, the hammer body 21 is slidably abutted against the plurality of ribs 12 so that the hammer body 21 and the inner surface of the main body 11 are gapped. As such, there is less contact area between the plurality of ribs 12 and the inner surface of the main body 11 so that it can effectively reduce contact friction resistance and ensure the smooth movement of the hammer body 21.

The main body 11 is tubular, two ends of the main body 11 are in communication with outside the main body 11, the main body 11 includes a first section 111 and a second section 112 connected to each other, the first section 111 and the second section 112 define the interior space 13, and the second section 112 has an inner diametric dimension larger than an inner diametric dimension of the first section 111. The plurality of ribs 12 project on the second section 112, and the plurality of ribs 12 increase the structural strength of the second section 112. When the hammer body 21 is moving in the interior space 13, gas driven by the hammer body 21 enters into or exits from the interior space 13 with less drawing resistance, thus ensuring the stability of the hammer body 21 in movement.

Specifically, the second section 112 has an outer diametric dimension larger than an outer diametric dimension of larger than the first section 111, and the first section 111 and the second section 112 form a stepped structure for helping to recognize the direction of assembly during the production assembly process. The first section 111 which has a smaller diametric dimension than that of the second section 112 facilitates gripping thereon and can be used as another auxiliary grip.

The handle assembly 1 further includes a linkage 15 and a lid 16. The linkage 15 is laterally connected to and between the main body 11 and the grip portion 14 so that the main body 11 and the grip portion 14 are distanced for easy gripping. Preferably, the main body 11, the grip portion 14 and the linkage 15 are integrally formed of one piece so that it has good structural strength. The lid 16 covers an end of the main body remote from the working assembly 3, the lid 16 includes a plurality of through holes 161, and the plurality of through holes 161 are in communication with the interior space 13. The lid 16 can effectively prevent foreign matters (such as dust, fingers or the like) from entering the interior space 13, and can protect personal safety. The lid 16 is preferably made of rubber, which is deformable according to the increase of gas pressure in the interior space 13.

The handle assembly 1 further includes a rigid tube 17 and a connection rod 18, the rigid tube 17 includes a channel 171, a first connecting hole 172 and a second connecting hole 173, the shaft 22 is disposed through the first connecting hole 172 and connected to the rigid rod 31, the connection rod 18 is disposed through the second connecting hole 173 and connected to the grip portion 14, and the shaft 22, the channel 171, the connection rod 18 and the grip portion 14 are in communication with one another for allowing the gas to flow in the hammer body 21.

The pneumatic hammer further includes four seal assemblies for avoiding gas leakage, and each of the four seal assemblies includes a seal ring 45 and an annular member 46. The seal ring 45 includes an outer ring body 451 and an inner ring body 452 which are connected to each other and concentrically arranged. The outer ring body 451 is made of rigid material, the inner ring body 452 is made of elastic material, and the inner ring body 452 is exposed within a central hole 461 of the annular member 46. When the seal ring 45 and the annular member 46 are abutted against each other, a portion of the inner ring body 452 protruding beyond the central hole 461 is not pressed by the annular member 46 and can provide good sealing effect.

Specifically, the four seal assemblies include a first seal assembly 41, a second seal assembly 42, a third seal assembly 43 and a fourth seal assembly 44. The first seal assembly 41 and the second seal assembly 42 are located at two sides of the first connecting hole 172, the inner ring body 452 of the first seal assembly 41 and the inner ring body 452 of the second seal assembly 42 are disposed around the shaft 22, the outer ring body 451 of the first seal assembly 41 is disposed and clamped between the rigid rod 31 and the rigid tube 17, the outer ring body 451 of the second seal assembly 42 is disposed and clamped between the shaft 22 and the rigid tube 17, the third seal assembly 43 and the fourth seal assembly 44 are located at two sides of the second connecting hole 173, the inner ring body 452 of the third seal assembly 43 and the inner ring body 452 of the fourth seal assembly 44 are disposed around the connection rod 18, the outer ring body 451 of the third seal assembly 43 is disposed and clamped between the connection rod 18 and the rigid tube 17, and the outer ring body 451 of the fourth seal assembly 44 is disposed and clamped between the grip portion 14 and the rigid tube 17.

Specifically, the seal ring 45 of the four seal assemblies have the same structure, the annular member 46 of the second seal assembly 42, and the annular member 46 of the third seal assembly 43 and the annular member 46 of the fourth seal assembly 44 have the same structure. The thickness and rigidity of the annular member 46A of the first seal assembly 41 are larger than the thickness and rigidity of the annular member 46 of the second seal assembly 42, so that it can withstand greater impact force without deformation, to provide good structural integrity, airtight effect and service life.

Preferably, the shaft 22 is rotatably disposed through the first connecting hole 172, and the rigid rod 31 is rotatable with the shaft 22, for easy angular adjustment of the driving member 32.

Preferably, the working assembly 3 further includes a nut 33, the driving member 32 is detachably screwed to the rigid rod 31, and the nut 33 is screwed to the rigid rod 31 and abutted against the driving member 32. The nut 33 can ensure that the driving member 32 cannot rotate freely and detach from the rigid rod 31.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pneumatic hammer, comprising:

a handle assembly comprising a main body and a grip portion, the grip portion being connected to the main body and configured to be connected to a gas source, the main body comprising an interior space;

a hammer assembly connected to and in communication with the grip portion, and comprising a hammer body and a shaft, the hammer body being movably connected to the shaft, and the hammer body being movably disposed in the interior space to hammer the shaft; and a working assembly comprising a rigid rod and a driving member, the rigid rod being connected to and movable with the shaft, the driving member being positioned to the rigid rod;

wherein the handle assembly further comprises a rigid tube and a connection rod, the rigid tube comprises a channel, a first connecting hole and a second connecting hole, the shaft is disposed through the first connecting hole and connected to the rigid rod, the connection rod is disposed through the second connecting hole and connected to the grip portion, and the shaft, the channel, the connection rod and the grip portion are in communication with one another.

2. The pneumatic hammer of claim 1, wherein further including four seal assemblies, each of the four seal assemblies includes a seal ring and an annular member, the seal ring includes an outer ring body and an inner ring body which are connected to each other and concentrically arranged, the outer ring body is made of rigid material, the inner ring body is made of elastic material, the inner ring body is exposed within a central hole of the annular member; the four seal assemblies include a first seal assembly, a second seal assembly, a third seal assembly and a fourth seal assembly, the first seal assembly and the second seal assembly are located at two sides of the first connecting hole, the inner ring body of the first seal assembly and the inner ring body of the second seal assembly are disposed around the shaft, the outer ring body of the first seal assembly is disposed between the rigid rod and the rigid tube, the outer ring body of the second seal assembly is disposed between the shaft and the rigid tube, the third seal assembly and the fourth seal assembly are located at two sides of the second connecting hole, the inner ring body of the third seal assembly and the inner ring body of the fourth seal assembly are disposed around the connection rod, the outer ring body of the third seal assembly is disposed between the connection rod and the rigid tube, and the outer ring body of the fourth seal assembly is disposed between the grip portion and the rigid tube.

3. The pneumatic hammer of claim 2, wherein the seal rings of the four seal assemblies have the same structure, the annular member of the second seal assembly, the annular member of the third seal assembly and the annular member of the fourth seal assembly have the same structure, and the thickness and rigidity of the annular member of the first seal assembly are larger than the thickness and rigidity of the annular member of the second seal assembly.

4. The pneumatic hammer of claim 1, wherein the shaft is rotatably disposed through the first connecting hole, and the rigid rod is rotatable with the shaft.

5. The pneumatic hammer of claim 1, wherein the working assembly further includes a nut, the driving member is detachably screwed to the rigid rod, and the nut is screwed to the rigid rod and abutted against the driving member.

6. The pneumatic hammer of claim 1, wherein a plurality of ribs project on an inner surface of the main body, and the hammer body is slidably abutted against the plurality of ribs so that the hammer body and the inner surface of the main body are gapped.

7. The pneumatic hammer of claim 6, wherein the main body is tubular, the main body includes a first section and a second section connected to each other, the first section and the second section define the interior space, the second section has an inner diametric dimension larger than an inner diametric dimension of the first section, and the plurality of ribs project on the second section.

8. The pneumatic hammer of claim 7, wherein the second section has an outer diametric dimension larger than an outer diametric dimension of the first section, and the first section and the second section form a stepped structure.

9. The pneumatic hammer of claim 3, wherein the shaft is rotatably disposed through the first connecting hole, and the rigid rod is rotatable with the shaft; the working assembly further includes a nut, the driving member is detachably screwed to the rigid rod, and the nut is screwed to the rigid rod and abutted against the driving member; a plurality of ribs project on an inner surface of the main body, and the hammer body is slidably abutted against the plurality of ribs so that the hammer body and the inner surface of the main body are gapped; the main body is tubular, two ends of the main body are in communication with outside, the main body includes a first section and a second section connected to each other, the first section and the second section define the interior space, the second section has an inner diametric dimension larger than an inner diametric dimension of the first section, and the plurality of ribs project on the second section; the second section has an outer diametric dimension larger than an outer diametric dimension of the first section, and the first section and the second section form a stepped structure; the handle assembly further includes a linkage and a lid, the linkage is laterally connected to and between the main body and the grip portion, the main body, the grip portion and the linkage are integrally formed of one piece, the lid covers an end of the main body remote from the working assembly, the lid includes a plurality of through holes, and the plurality of through holes are in communication with the interior space; the lid is made of rubber; the rigid rod has a length larger than a length of the main body; the rigid rod is a solid rod.

* * * * *